UNITED STATES PATENT OFFICE.

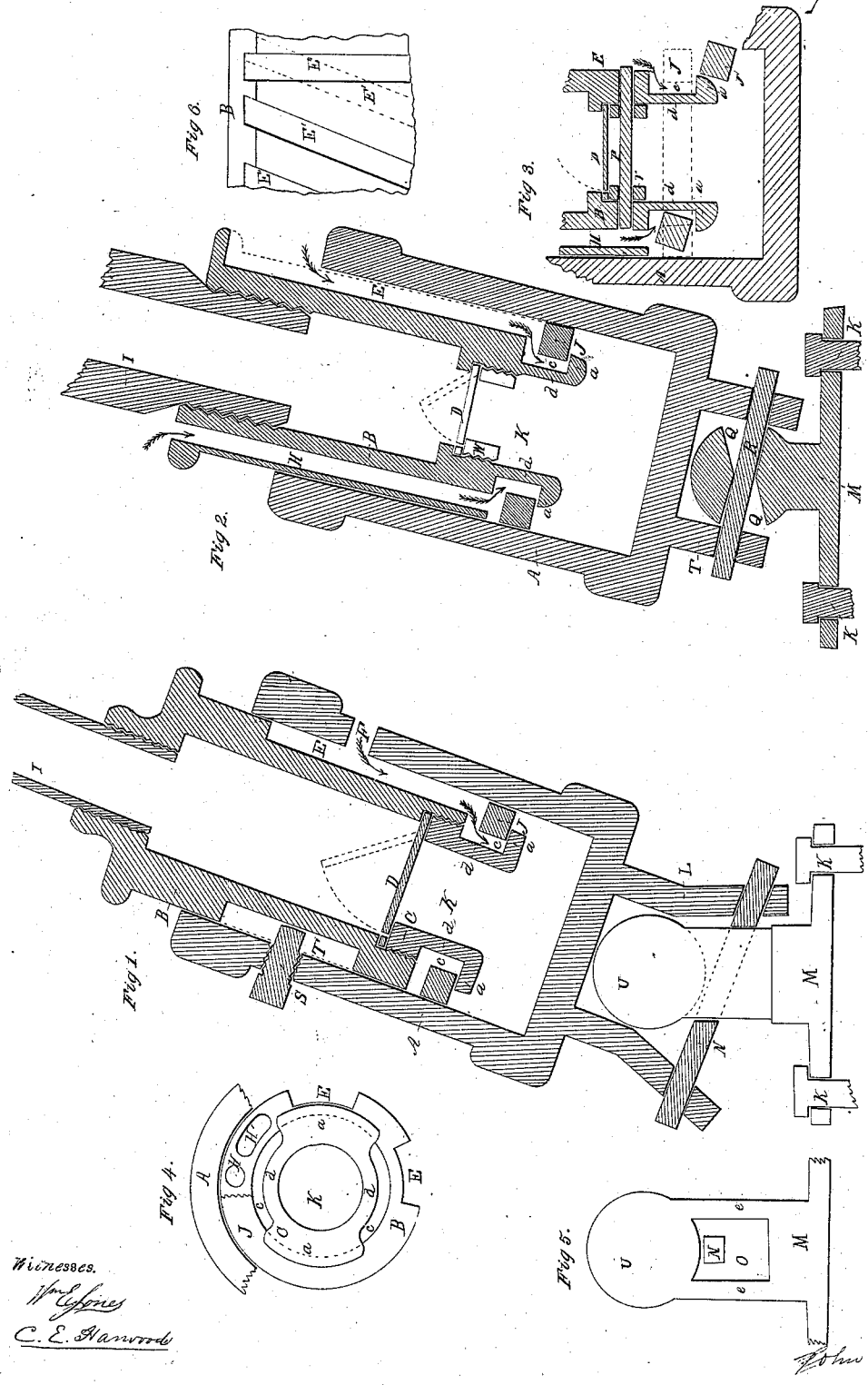

JOHN M. MAY, OF JANESVILLE, WISCONSIN.

PUMP.

Specification of Letters Patent No. 32,251, dated May 7, 1861.

*To all whom it may concern:*

Be it known that I, JOHN M. MAY, of the city of Janesville, in Rock county, State of Wisconsin, have invented a new and useful Improvement in Pumps for Pumping Water and other Fluids; and I do hereby declare that the following is a full, clear, and exact description thereof, reference being had to the accompanying drawings and to the letters of reference marked thereon.

The nature of my invention consists, 1st, in inducting water and other fluids into a pump cylinder through longitudinal, or spiral channels, or holes in the sides of a piston—the bottom of the cylinder being whole, or without induction opening; 2d, in opening and closing the lower end of inducting channels, or holes in the sides of a piston, by means of a sliding ring located at the lower end of the piston; 3rd, in connecting a cylinder and piston together and regulating the extreme length of stroke by means of a set screw passing through the side of the cylinder, and the end of the screw extending into, and fitting easily a longitudinal groove in the piston; 4th, a toggle joint to connect a pump to a base or foundation so that the pump may be made to occupy any desired angle relatively to the base.

In the accompanying drawings the same letters of reference indicate corresponding parts in each figure.

Figures 1, and 2, are vertical sections through the center of a pump. Fig. 3, is a vertical section showing a mode of securing a sliding ring, and a valve seat, in their places. Fig. 4, is an inverted horizontal section and view of the lower end of the piston, ring, valve seat, and a part of the cylinder. Fig. 6, is a vertical section of a piston showing longitudinal, and spiral induction grooves. Fig. 5, is a vertical section of a member of a toggle joint, at right angles with the same part of the toggle joint as shown in Fig. 1.

A in Fig. 1, is a cylinder with the bottom whole, or without any induction aperture, but has one or more induction apertures F, in its side, that communicate with one or more channels E, in piston B, through which channels water and fluids freely descend in the direction of the arrows, passing between the interior diameter of the sliding ring J, and the neck $d$, of the valve seat C, through the space $c$, and between flanges or projections $a$, into the cylinder. The channel E, may extend up the piston only to the aperture F, as in Fig. 1, or may extend the entire length of the piston as E, in Fig. 2. Also these channels may be made longitudinal with the piston, or spirals, as shown at E, or E', in Fig. 6. The advantage of spiral grooves or channels, is that the surfaces between the channels comes in contact with the entire interior surface of the cylinder as the pump is operated. When the induction channels extend the entire length of the piston the aperture F, in the cylinder is closed or omitted in making the cylinder.

Instead of receiving fluids at F, in Fig. 1, or at the top of the cylinder as in Fig. 2, at E, the channels may be wholly omitted, and one or more holes in the sides of the piston either round or oblong as H, and H', in Figs. 2 and 4, constitute the induction channels, and the fluid received at the top of the piston as at H, in Fig. 2.

The sliding ring J, has its upper surface sufficiently wide to cover the induction channels, or holes as the piston descends in the cylinder, and fluids are forced upward, through throat K, of valve seat C, as in Fig. 1, or through throat K, of the piston as in Fig. 2, and thence through valve D, and eduction pipe I. As the piston is moved upward, ring J, is received on the projection $a$, of valve seat C, Fig. 1, or on projection $a$, of the lower end of the piston as shown in Fig. 2, and ascends with the piston, thus allowing fluids to pass freely to the cylinder as before described, the ring J, thus alternately opens and closes the induction channels.

Valve seat C, Fig. 1, and W, Fig. 2, are screwed to their places, and valve seat V, in Fig. 3, is kept in place by pin P.

When the lower end of the piston is made as shown in Figs. 2 and 3, ring J, is placed upon the neck $d$, as shown in Fig. 3, before the piston is placed in the cylinder.

The inverted horizontal section, Fig. 4, shows a portion of cylinder A, of the end of piston B, of holes H, or H', and channels E, of ring J, and projections $a$. The cylinder A, and piston B, are kept together and the greatest length of stroke of the pump regulated by the device consisting of one or more set screws S, passing through the side of the cylinder, and the end of the set screw fitting easily the longitudinal channel T, Fig. 1. This device is described in a patent issued from the United States Patent Office to me on the 23rd day of August, A. D. 1859, in the following words, the term "inner cylinder" being therein used to denote what I call in this application, a piston: "B, the outer and stationary cylinder, is connected with the inner cylinder C, by means of set screw n, the point of which screw fits easily the longitudinal groove or channel O, the inner cylinder being embossed longitudinally in the interior to make room for the groove O, and not allow any communication from inside of the cylinder C, with the groove. This groove and set screw are important in preventing the two cylinders from separating when putting in and taking out the pump, and in gaging the length of the stroke of the pump." A pin may be used instead of a set screw to accomplish the same purpose.

On the above described device, for holding together a pump cylinder and piston, I omitted to make a claim.

In Figs. 1 and 5 I show a method of forming a toggle joint by means of base M, with a column extending upward and terminating in a ball U, which column has a space O, between the sides e, e, through which passes the bar N. This bar extends from side to side, and through the inverted tunnel shaped projection L, at the bottom of the cylinder, and within which the ball U, has an easy fit, so that while the base and cylinder are connected together by the bar N, the pump may be inclined to any desired angle relatively with the base M. The part L, may be made separate from the bottom of the cylinder and fastened to it in any suitable manner, or may be cast with the cylinder. The same object is substantially attained as shown in Fig. 2 by base M, with a vertical extension, having a double bell shaped hole Q, Q, through which passes bar R, which passes through the tube or extension T at the bottom of the cylinder. Or instead of the base M, and vertical projection, used in part in forming a toggle joint, as seen in Fig. 2, a rod, or bar, may extend downward, from the bottom of the cylinder or pump, to any desired distance, and the base or bottom of the rod or bar be fastened firm and solid in any proper manner, while the upper end of the rod is made with a double bell-shaped hole Q, Q, as already described, to receive the bar R. If the hole through the upper end of the rod is not bell-shaped, it must be large enough, and the rod fitted sufficiently loose in the tube or to the lower end of the pump to allow the pump to be used in any desired position or angle. Also the tube or projection, T, may be made with an embossment on its inside, at the place where the bar, R, passes through it, to aid in keeping the bearing as near the center, underneath the bottom of the pump as practicable. A toggle joint I also use to connect a piston of a submerged pump with a rod, projection, or base, M, the cylinder being inverted, and operated with eduction pipe, in any desired angle or position. I also attach a pump by means of a toggle joint to the bottom inside of a pail, bucket, or other suitable water reservoir, that can be easily moved from place to place, inside or outside of a building, and eject water therefrom with a pump for extinguishing fire or for any desired purpose. Among other advantages this toggle joint connection of a base rod or foundation with a cylinder or pump, is the facility of readily inclining the pump in any desired angle or direction in operating it, as in watering gardens, pumping fluids, &c., over the sides of vats and casks, and as a domestic fire engine without the absolute necessity of using hose.

Inducting water into a cylinder as herein described, prevents the sucking into the pump gravel, sand and impurities at the bottom of vats, reservoirs, &c., that are liable to be drawn in, and obstruct the operation of the pump as is the case when the induction is at the bottom of the cylinder—and also cheapens the construction of the pump.

The advantages of so cheap a device as a sliding ring to open and close alternately the induction channels, and the device of a set screw and longitudinal groove in the piston to connect together a cylinder and piston, are obviously cheap, strong and durable.

What I claim as my invention and desire to secure by Letters Patent is—

1. A piston made with one or more grooves or holes in the side thereof, in combination with a sliding ring to open and close alternately, induction grooves or holes as the pump is operated, and a cylinder without induction aperture in its bottom, when a piston, a ring, and a cylinder are constructed and arranged relatively to each other, substantially as, and for the purpose described.

2. A set screw, or pin, passing through the side of a cylinder with its point extending into, and fitting easily, a longitudinal groove or channel in a piston, when used to connect a cylinder and piston, and regulate the stroke of a pump, substantially as described.

3. A toggle joint, or its equivalent, in combination with a rod, or base, M, cylinder, A, piston, B, and eduction pipe, I; when constructed substantially as, and for the purpose described.

JOHN M. MAY.

Witnesses:
 DAVID L. MILLS,
 R. B. TREAT.